United States Patent
Nakamura et al.

(10) Patent No.: US 10,444,841 B2
(45) Date of Patent: *Oct. 15, 2019

(54) METHOD AND APPARATUS FOR GENERATING HAPTIC FEEDBACKS FOR ELECTRONIC APPARATUSES

(71) Applicant: LENOVO (SINGAPORE) PTE. LTD., Singapore (SG)

(72) Inventors: Fusanobu Nakamura, Kanagawa (JP); Mitsuhiro Yamazaki, Kanagawa (JP); Atsushi Nagashima, Kanagawa (JP); Kazunori Yamamura, Kanagawa (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 70 days.

This patent is subject to a terminal disclaimer.

(21) Appl. No.: 15/691,338

(22) Filed: Aug. 30, 2017

(65) Prior Publication Data
US 2018/0059794 A1 Mar. 1, 2018

(30) Foreign Application Priority Data
Aug. 30, 2016 (JP) .................................. 2016-167472

(51) Int. Cl.
*H04B 3/36* (2006.01)
*G06F 3/01* (2006.01)
*G06F 3/041* (2006.01)
*H02K 7/06* (2006.01)
*H02K 33/00* (2006.01)
(Continued)

(52) U.S. Cl.
CPC .............. *G06F 3/016* (2013.01); *G06F 3/041* (2013.01); *G06F 3/0488* (2013.01); *H02K 7/061* (2013.01); *H02K 33/00* (2013.01); *H02K 33/02* (2013.01)

(58) Field of Classification Search
None
See application file for complete search history.

(56) References Cited

U.S. PATENT DOCUMENTS 6,422,941 B1 * 7/2002 Thorner .................. A63F 13/02
273/148 B
2007/0103437 A1 * 5/2007 Rosenberg ........... G09B 23/285
345/161
(Continued)

FOREIGN PATENT DOCUMENTS

JP 03-42079 A 2/1991
JP 11-128838 A 5/1999
(Continued)

*Primary Examiner* — Brent Swarthout
(74) *Attorney, Agent, or Firm* — Antony P. Ng; Russell Ng PLLC (57) ABSTRACT

A haptic actuator for generating haptic feedbacks to provide perceptions of different characteristics is provided. The haptic actuator includes a vibration mechanism and a striking mechanism. The vibration mechanism, in response to a receipt of a predetermined electric power, applies a steady vibration to a vibrating body. The striking mechanism, in response to the receipt of an electric power larger than the predetermined electric power, strikes the vibrating body in order to provide a haptic feedback to the vibrating body. The haptic actuator is able to apply a vibration according to the vibration mechanism and a vibration according to the striking mechanism to the vibrating body.

20 Claims, 9 Drawing Sheets

(51) Int. Cl.
*H02K 33/02* (2006.01)
*G06F 3/0488* (2013.01)

(56) References Cited

U.S. PATENT DOCUMENTS

| | | | | |
|---|---|---|---|---|
| 2011/0121953 A1* | 5/2011 | Grant | ................... | A63F 13/245 |
| | | | | 340/407.1 |
| 2012/0223824 A1* | 9/2012 | Rothkopf | ................ | G06F 3/016 |
| | | | | 340/407.1 |
| 2018/0061194 A1* | 3/2018 | Yamazaki | ............. | B06B 1/0215 |

FOREIGN PATENT DOCUMENTS

| | | |
|---|---|---|
| JP | 2004-181305 | 7/2004 |
| JP | 2007122501 A | 5/2007 |
| JP | 2010-060044 | 11/2010 |
| JP | 2015-527030 | 11/2010 |
| JP | 2011097747 A | 5/2011 |
| JP | 2014-193451 | 10/2014 |
| JP | 2015-83305 A | 4/2015 |
| JP | 2015157277 A | 9/2015 |

\* cited by examiner

METHOD AND APPARATUS FOR GENERATING HAPTIC FEEDBACKS FOR ELECTRONIC APPARATUSES

PRIORITY CLAIM

The present application claims benefit of priority under 35 U.S.C. §§ 120, 365 to the previously filed Japanese Patent Application No. JP2016-167472 with a priority to date of Aug. 30, 2016, which is incorporated by reference herein.

TECHNICAL FIELD

The present invention relates to electronic apparatuses in general, and in particular to a technique of generating haptic feedbacks for electronic apparatuses.

BACKGROUND

Electronic apparatuses such as tablet terminals, smartphones, and mobile phones having a touch screen or a chassis may be provided with a haptic actuator that gives tactile feedbacks to the human body. A haptic actuator transmits a vibration to a vibrating body such as a touch screen or a chassis in response to an event generated by the system. A user perceives the vibration at the site with which the user has touched the vibrating body, or perceives the vibration as a sound. Haptic actuators, which use electric power as a driving source, can generally be characterized as an impact type or a vibration type, depending on the characteristics of the vibration.

Examples of the impact type haptic actuators include a shape memory metal impact actuator (SIA) that uses shape memory alloy. In the impact type haptic actuator, a vibration element strikes a vibrating body to provide a transient vibration. Examples of the vibration type haptic actuators include an eccentric rotating mass (ERM) actuator that uses an eccentric motor, a linear resonant actuator (LRA) that causes an alternating current to flow through a coil in a magnetic field to vibrate a movable element, and a piezoelectric actuator that uses a piezoelectric element. The vibration type haptic actuator gives a vibration of constant amplitude to a vibrating body for a predetermined time.

It will be convenient if haptic feedback can provide a set of perceptions having different characteristics according to the usage. For example, for a keystroke on a software keyboard, it is appropriate to give a strong, transient vibration that lasts a short time on the touch screen, so as to be able to address continuous keystrokes. For informing a user of an incoming mail or push notification from a website, it is appropriate to vibrate the chassis for a relatively long time enough for the user to notice it.

Currently, disposing both an impact type haptic actuator and a vibration type haptic actuator in a chassis of an electronic apparatus is disadvantageous from the space saving and cost saving standpoints.

Consequently, it would be preferable to provide an improved technique for generating haptic feedbacks for electronic apparatuses.

SUMMARY

In accordance with an embodiment of the present disclosure, a haptic actuator includes a vibration mechanism and a striking mechanism. The vibration mechanism, in response to a receipt of a predetermined electric power, applies a steady vibration to a vibrating body. The striking mechanism, in response to the receipt of an electric power larger than the predetermined electric power, strikes the vibrating body in order to provide a haptic feedback to the vibrating body. The haptic actuator is able to apply a vibration according to the vibration mechanism and a vibration according to the striking mechanism to the vibrating body. The striking mechanism is able to provide a strong vibration by striking the vibrating body.

The vibration mechanism includes a coil, a magnet that forms a magnetic field around the coil, and a movable element that performs a reciprocating operation in directions along an axis of vibration in response to an application of a first driving voltage to the coil. The striking mechanism strikes the vibrating body as the striking mechanism is displaced in conjunction with an operation of the movable element responsive to application of a second driving voltage larger than the first driving voltage to the coil.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
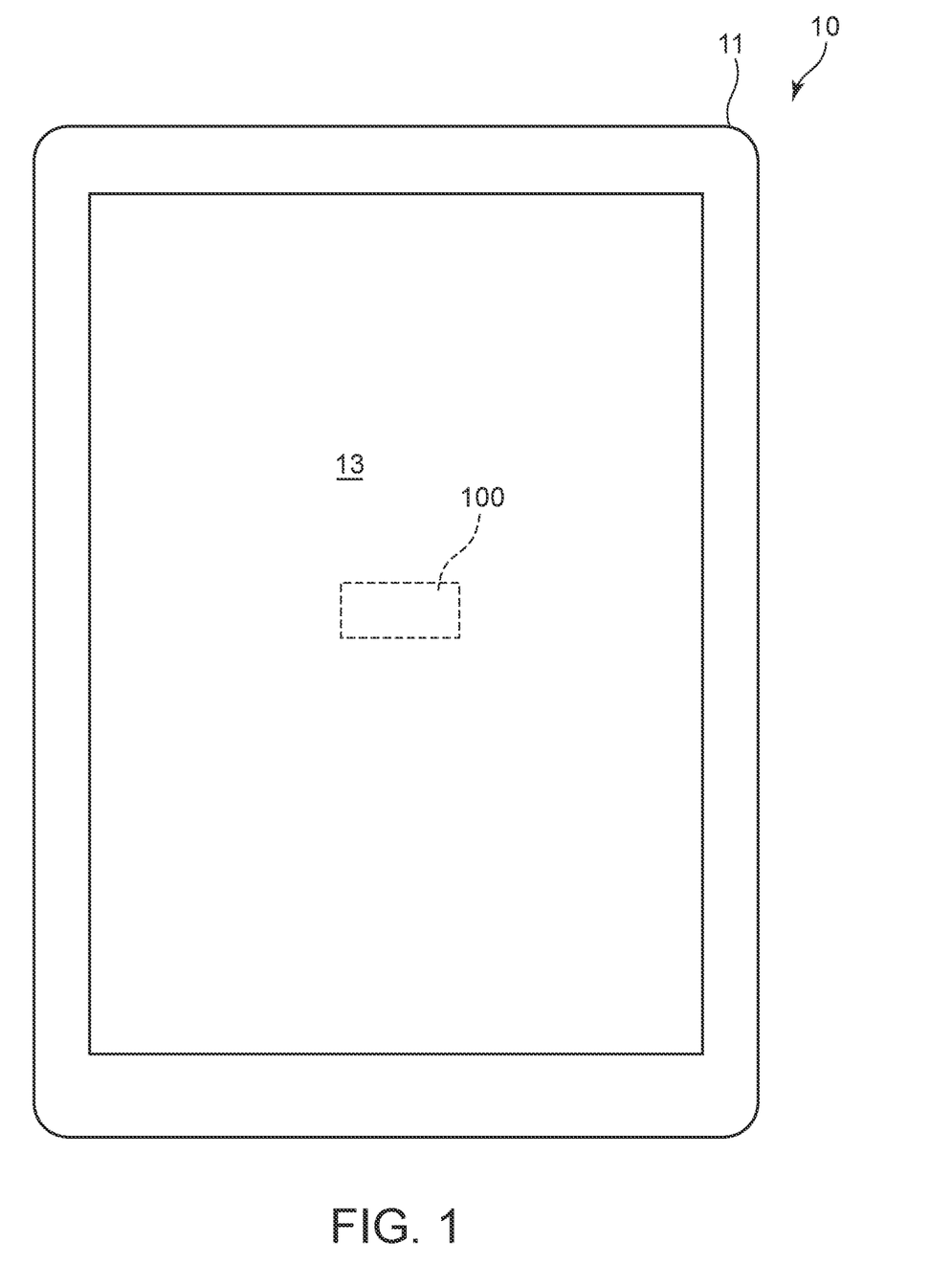
FIG. 1 is a plan view of a smartphone as an example of an electronic apparatus.
Figure 2:
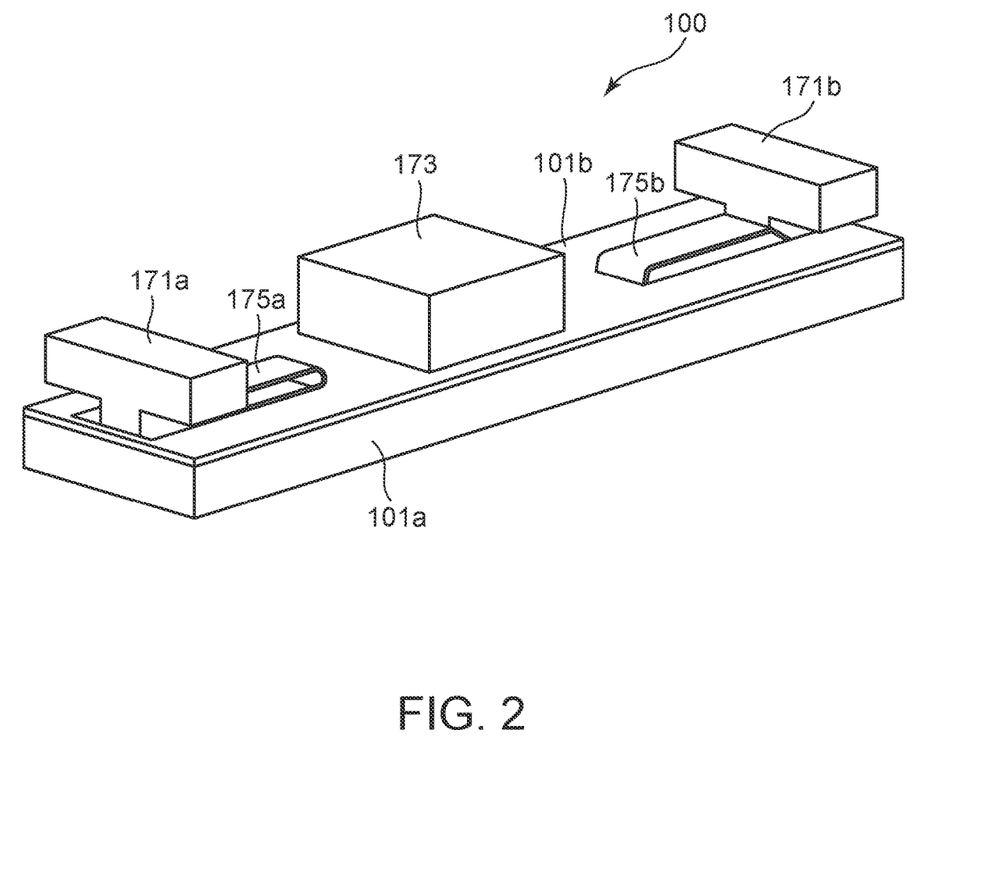
FIG. 2 is a perspective view showing an appearance of an actuator.
Figure 3A:
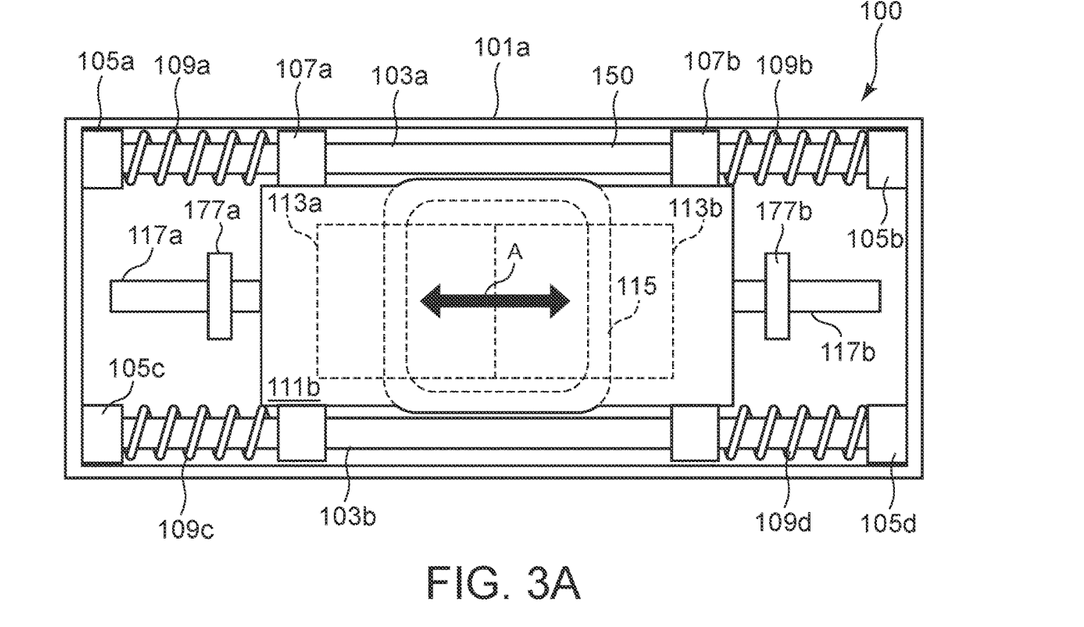
FIGS. 3A-3B are a plan view and a cross-sectional view, respectively, illustrating a structure of the actuator from FIG. 2.
Figure 3B:
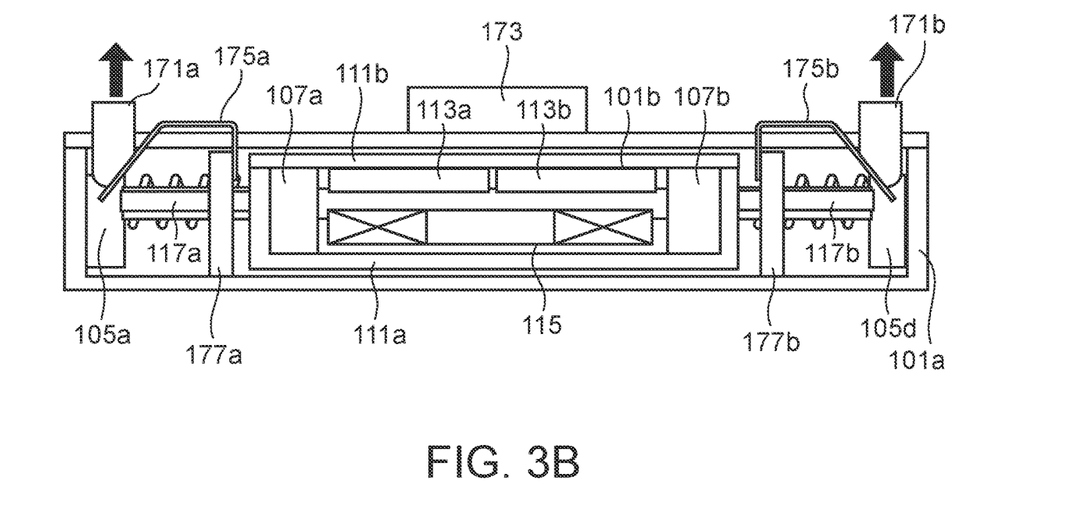

FIG. 1 is a plan view of a smartphone as an example of an electronic apparatus. As shown, a dual-mode haptic actuator 100 is mounted on a smartphone 10, according to an embodiment of the present invention. The actuator 100 is disposed inside a chassis 11, to apply haptic feedback from the back of a touch screen 13. FIG. 2 is a perspective view showing an appearance of the actuator 100. FIGS. 3A and 3B are a plan view and a cross-sectional view, respectively, illustrating the structure of the actuator 100.

In FIG. 2, the actuator 100 is of a flat, long and narrow shape that extends along an axis of vibration. The actuator 100 operates in a vibration mode, in which a movable element 150 (see FIGS. 3A-3B) vibrates at constant amplitude, and in a strike mode, in which the movable element 150 strikes a vibrating body, in accordance with an event from the system. A haptic effect in the vibration mode is generated using a steady-state vibration of the movable element 150, and a haptic effect in the strike mode is generated using a transient vibration of the movable element 150.

The actuator 100 has a vibration mechanism including the movable element 150, which is housed in a lower chassis 101a and an upper chassis 101b. Hammers 171a and 171b protrude upwardly from respective longitudinal ends of the upper chassis 101b, although only one of the hammers 171a, 171b may be provided. The hammers 171a and 171b are elastically supported by leaf springs 175a and 175b, respectively.

A striking mechanism includes the movable element 150, at least one hammer 171a, 171b, and the corresponding leaf spring 175a, 175b. The leaf springs 175a, 175b cause the hammers 171a, 171b to remain in the home position when the actuator 100 is stopped. In the strike mode, the leaf springs 175a, 175b cause the hammers 171a, 171b to move in an upward direction in the figure to the striking position, while applying elastic force to the movable element 150 that is displaced to a large extent. At the center of the upper chassis 101b, a spacer 173 is provided through which the actuator 100 is affixed to the rear surface of the touch screen 13.

FIG. 3A is a plan view of the actuator 100, with the upper chassis 101b, the hammers 171a, 171b, the leaf springs 175a, 175b, and the spacer 173 removed therefrom. FIG. 3B is a cross-sectional view taken along the longitudinal centerline in FIG. 3A. Shafts 103a and 103b have their respective ends fixed to the lower chassis 101a via securing portions 105a to 105d.

The shafts 103a and 103b penetrate through corresponding ends of weights 107a and 107b to allow the weights 107a, 107b to perform a reciprocating linear motion. Compression coil springs 109a to 109d are disposed between the securing portions 105a to 105d and the weights 107a, 107b. Magnets 113a and 113b of different magnetic pole directions are affixed to a lower surface of an upper yoke 111b. A coil 115 is disposed in a coil space formed by the upper yoke 111b and a lower yoke 111a.

The coil 115 is fixed to the lower chassis 101a via a securing member (not shown). The magnetic flux emitted from the magnets 113a, 113b flow through the magnetic path configured with the upper yoke 111b, the lower yoke 111a, and the coil space. The lower yoke 111a has end surfaces in the vibration directions to which shafts 117a and 117b are fixed. Spring securing portions 177a and 177b are fixed to the lower chassis 101a, and serve to secure the leaf springs 175a and 175b, respectively.

The shafts 117a and 117b penetrate through the spring securing portions 177a and 177b, respectively. The upper yoke 111b, the lower yoke 111a, the weights 107a and 107b, the magnets 113a and 113b, and the shafts 117a and 117b constitute the movable element 150. It should be noted that the actuator 100 may be configured such that the movable element includes the coil and that the magnets and yokes are fixed to the lower chassis 101a.

Figure 4A:
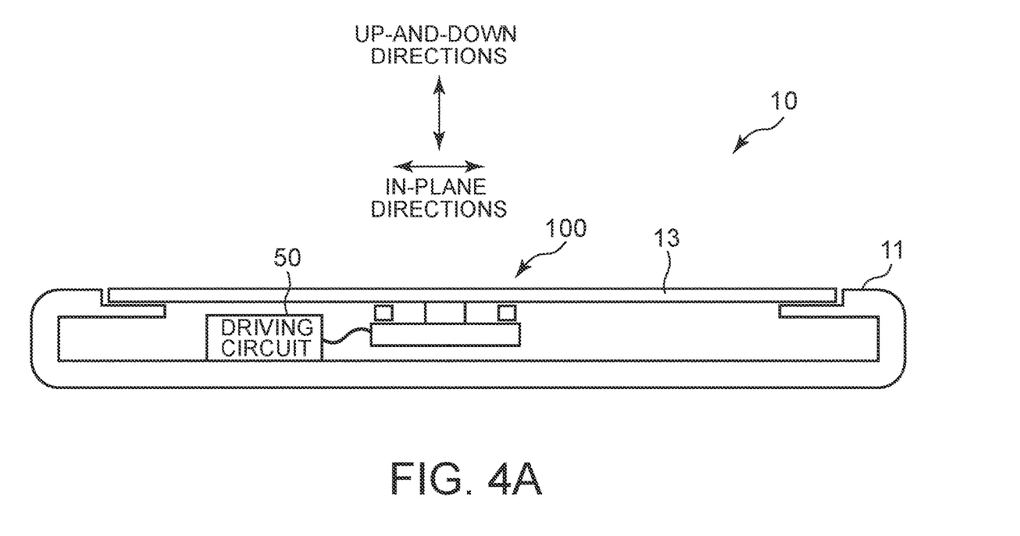
FIGS. 4A-4C are cross-sectional views of the smartphone from FIG. 1.
Figure 4B:
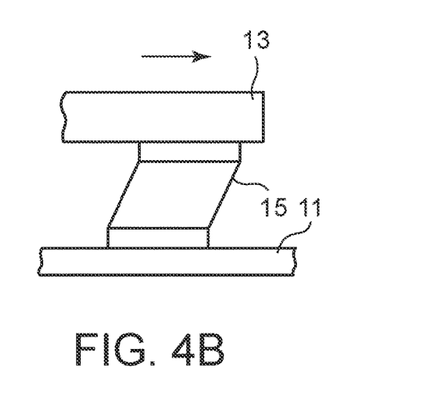
Figure 4C:
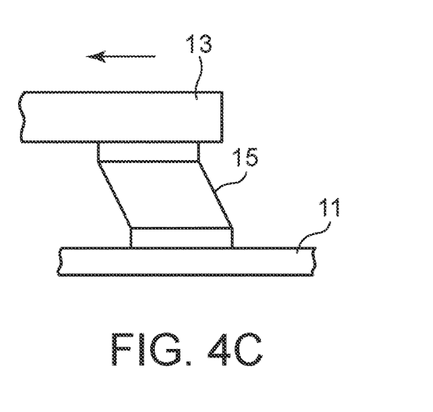

FIGS. 4A, 4B and 4C are cross-sectional views of the smartphone 10 from FIG. 1. FIG. 4A shows the state where the actuator 100 is attached to the touch screen 13, and FIGS. 4B and 4C are enlarged views of a portion where the touch screen 13 is attached to the chassis 11. In FIG. 4A, the directions perpendicular to the surfaces of the touch screen 13 are defined as up-and-down directions, and the horizontal directions are defined as in-plane directions. As the space inside the chassis 11 is small in the up-and-down directions, the actuator 100 is disposed so that the axis of vibration extends in the in-plane directions, and the spacer 173 is affixed to the rear surface of the touch screen 13.

The touch screen 13 is fixed to the chassis 11 via a double-sided tape 15. The double-sided tape 15 has a body formed of a cushioning material such as polyurethane foam or polyethylene foam, with its both sides coated with adhesive. With only its periphery fixed, the touch screen 13 is apt to vibrate in the up-and-down directions. As shown in FIGS. 4B and 4C, the double-sided tape 15 can provide the touch screen 13 with a degree of freedom of displacement in the in-plane directions, allowing the touch screen 13 to vibrate in the in-plane directions in addition to the up-and-down directions.

An operation of the actuator 100 mounted on the smartphone 10 will now be described. In a state where no driving voltage is applied to the coil 115, the movable element 150 is placed in a neutral position, with no contact between the shafts 117a, 117b and the leaf springs 175a, 175b. The hammers 171a, 171b are located in the home position, with no contact with the touch screen 13. To cause the actuator 100 to operate in a vibration mode, a driving circuit 50 applies to the coil 115 a square wave driving voltage having a frequency equivalent to a resonant frequency of the movable element 150 for a predetermined time required for a haptic effect.

The movable element 150 performs a steady, reciprocating linear motion at constant frequency and amplitude in directions along the axis of vibration shown by the arrow A, due to the Lorentz force occurring in the coil 115 by the magnetic field formed by the magnets 113a, 113b, and the elastic force of the compression coil springs 109a to 109d. The steady vibration of the movable element 150 propagates to the lower chassis 101a and the upper chassis 101b, and further propagates through the spacer 173 to the touch screen 13. As the upper chassis 101b vibrates in the in-plane directions, the touch screen 13 vibrates in the in-plane directions in the vibration mode.

Figure 5:
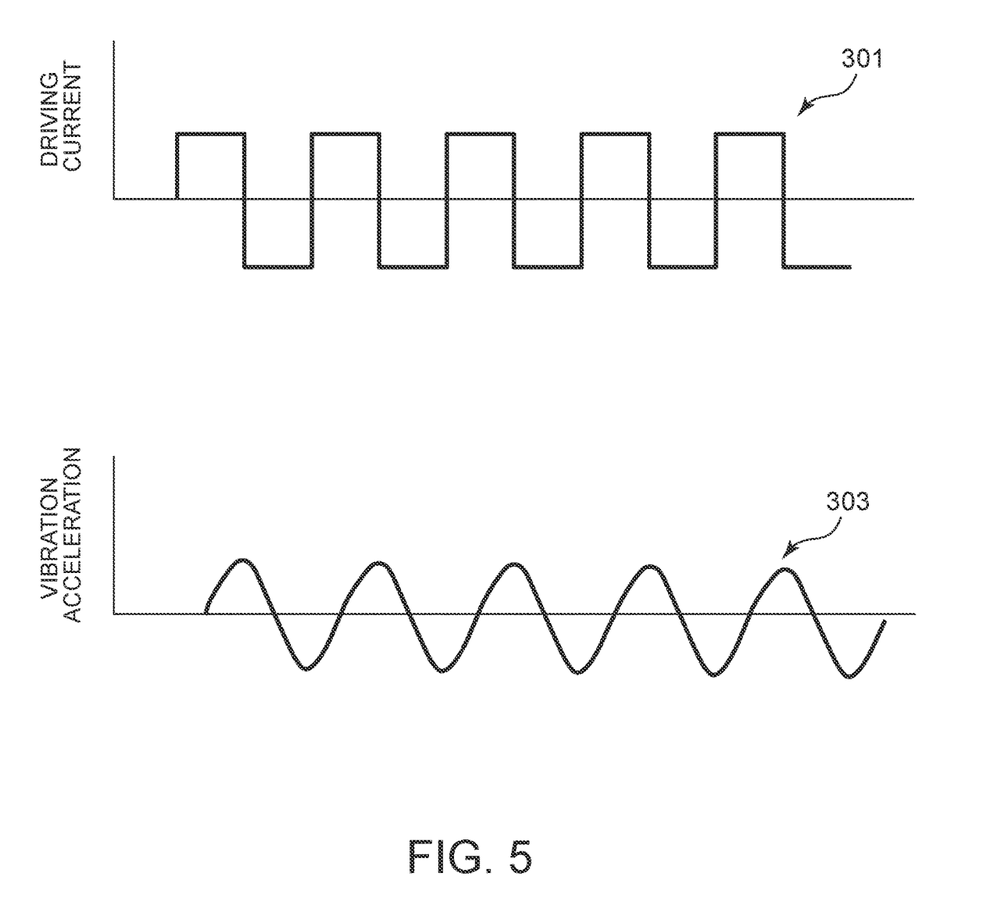
FIG. 5 illustrates a driving current of the actuator from FIG. 2, operating in a vibration mode and a vibration acceleration that occurs in a touch screen.

The amplitude of the movable element 150 in the vibration mode is set so that the shafts 117a, 117b will not impact the leaf springs 175a, 175b. Thus, in the vibration mode, the hammers 171a, 171b are not displaced. FIG. 5 shows a driving current 301 that flows through the coil 115 at this time, and a vibration acceleration 303 in the in-plane directions that occurs in the touch screen 13. Next, to cause the actuator 100 to operate in the strike mode, the driving circuit 50 applies a driving voltage larger than in the vibration mode to the coil 115, for a time shorter than the time for which the driving voltage is applied in the vibration mode.

Figure 6:
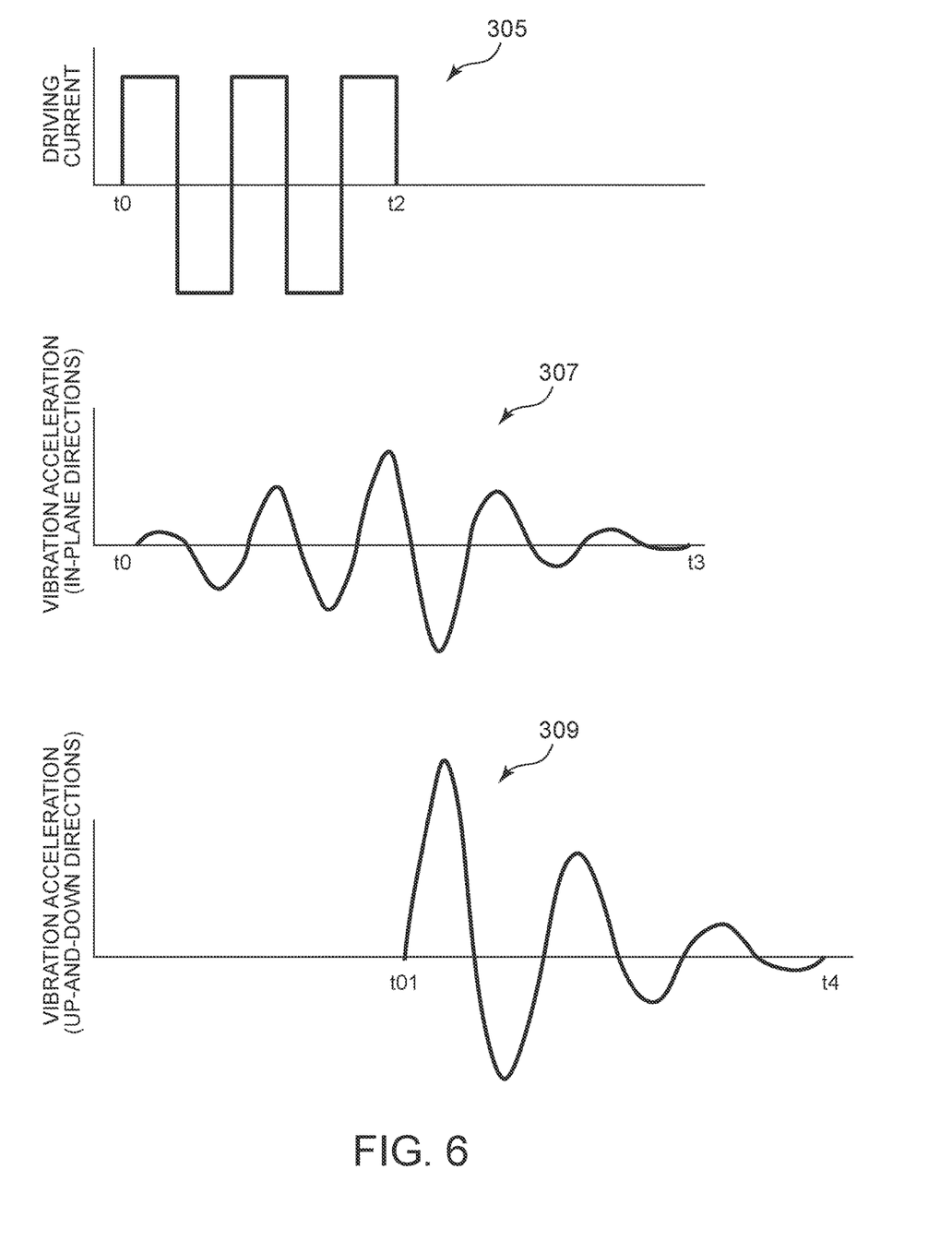
FIG. 6 illustrates a driving current of the actuator operating in a strike mode and vibration accelerations that occur in the touch screen.

FIG. 6 shows a driving current 305 that flows through the coil 115 at this time, a vibration acceleration 307 in the in-plane directions that occurs on the touch screen 13, and a vibration acceleration 309 in the up-and-down directions that occurs on the touch screen 13. In a transient state from when a square wave driving voltage was applied to the coil 115 at time t0 until when the vibration becomes stable, the driving current 305 flows through the coil 115, and the vibration acceleration 307 in the in-plane directions increases gradually. The driving circuit 50 stops the driving voltage at time t2 when a certain time has passed or at time t2 after counting a certain number of pulses. The driving voltage in the strike mode is larger than the driving voltage in the vibration mode, so the vibration acceleration 307 has reached a maximum value, exceeding the maximum value of the vibration acceleration 303, before reaching the time t2.

The amplitude of the movable element 150 attains the maximum value before reaching the time t2, and one of the shafts 117a, 117b impacts the corresponding leaf spring 175a or 175b at time t01. With this, the corresponding hammer 171a or 171b is displaced upwardly, and strikes the rear surface of the touch screen 13. The hammer that gave the stroke returns to the home position with the elastic force of the corresponding leaf spring 171a or 171b when the movable element 150 moves in the opposite direction with the elastic force of the compression coil springs 109a to 109d. The touch screen 13 that was struck starts vibrating at time t01, with the vibration acceleration 309 in the up-and-down directions. The peak value of the vibration acceleration 309 caused by the striking of a hammer 171a, 171b can be made larger than the peak value of the vibration acceleration 307 in the in-plane directions.

After the time t2, with the absence of exciting force, the vibration of the movable element 150 attenuates with free vibration, and at time t3, the vibration acceleration 307 reaches the level where the vibration is unfelt by a human. Further, after the time t2, the amplitude of the movable element 150 decreases, so the vibration in the up-and-down directions also attenuates with free vibration, with no repeated striking of the touch screen 13 by the hammers 171a, 171b. In another example, the time for which the driving voltage is applied in the strike mode may be elongated so that the hammers 171a and 171b give a plurality of strokes alternately.

The period of time or the number of applied pulses until the driving voltage is stopped can be determined in advance through experiments. Although the movable element 150 has only one degree of freedom of vibration, the actuator 100 is able to provide the touch screen 13 with a steady vibration in the in-plane directions, which lasts a relatively long time, and a strong, transient vibration in the up-and-down directions. Thus, when the actuator is operated in the strike mode in response to keystrokes on the software keyboard and in the vibration mode in response to dragging or other gesture operations on the touch screen 13, the user can perceive, at the fingertips, haptic feedback of different characteristics in accordance with a user's manipulations.

Figure 7:
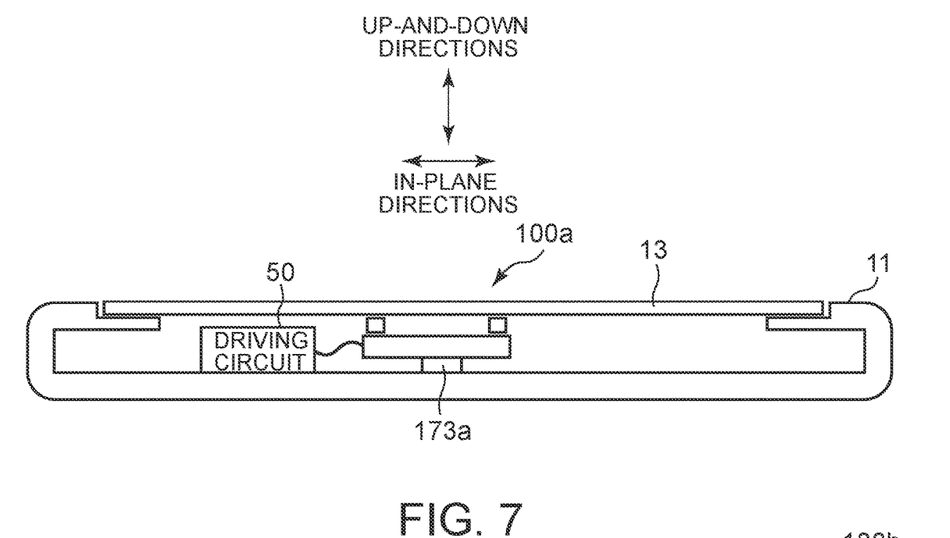
FIG. 7 illustrates another way of attaching an actuator.

The actuator 100, capable of applying a steady vibration and a vibration by striking to the touch screen 13, can be attached to the smartphone 10 in various manners so as to implement haptic feedback of different characteristics. FIG. 7 illustrates how an actuator 100a is attached. The actuator 100a differs from the actuator 100 shown in FIGS. 3A, 3B, 4A, 4B, and 4C only in that the actuator 100a is attached to the chassis 11 via a spacer 173a which is attached to the lower chassis 101a.

The spacer 173a allows the bottom surface of the chassis 11 to vibrate in in-plane directions in the vibration mode, and allows the touch screen 13 to vibrate in up-and-down directions in the strike mode. When a user holds the smartphone 10 with the left hand and performs manipulations on the touch screen 13 with the right hand, the user can perceive, at the fingertip, the vibration of the touch screen 13 in the strike mode in response to a software keyboard manipulation, and can perceive, with the left hand, the vibration of the chassis 11 in the vibration mode in response to a gesture manipulation. It should be noted that an actuator 100 or 100a may be attached to the chassis 11 by directly affixing the lower chassis 101a to the inner surface of the chassis 11, in which case the spacer 173 or 173a can be omitted.

Figure 8:
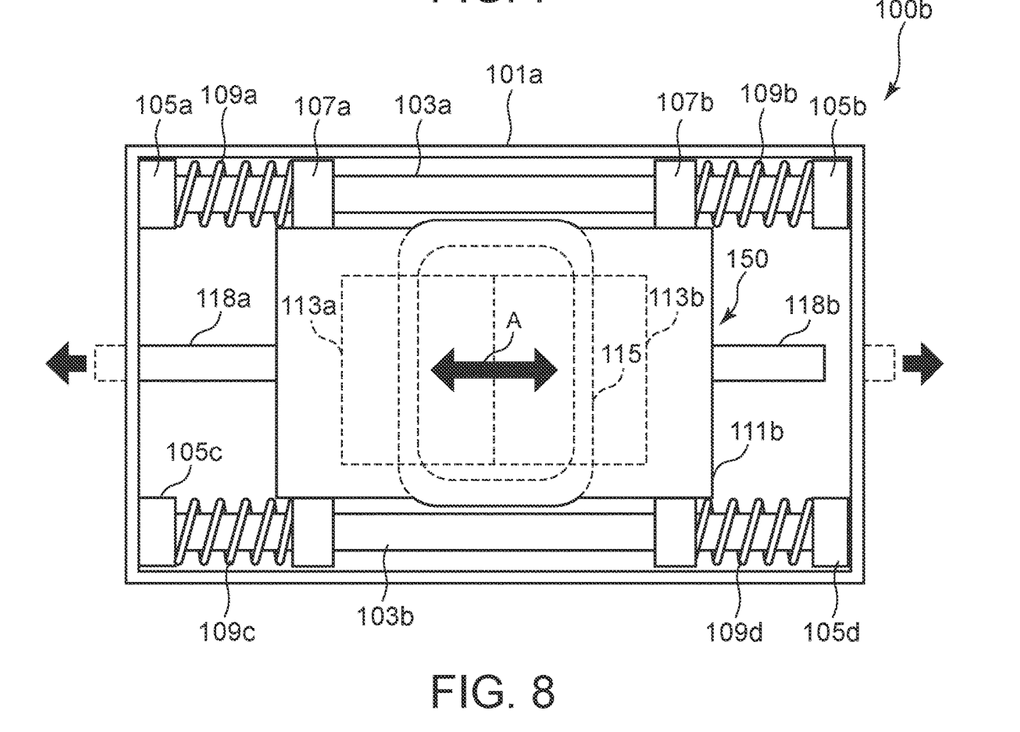
FIG. 8 is a plan view illustrating a structure of a different actuator.

In the actuators 100 and 100a, the magnitude and time of application of the driving voltage are adjusted to cause the lower chassis 101a and the upper chassis 101b to vibrate in directions along the axis of vibration and cause the hammers 171a, 171b to be displaced at a right angle with respect to the axis of vibration, but the directions of the axis of vibration and striking are not limited to these directions. FIG. 8 is a plan view illustrating an actuator 100b that causes a lower chassis 101a and an upper chassis 101b as well as hammers to vibrate in directions along the axis of vibration. The actuator 100b includes shafts 118a and 118b serving also as the hammers, in place of the shafts 117a and 117b of the actuator 100.

The shafts 118a and 118b are configured such that one of the shafts protrudes through a sidewall of the lower chassis 101a in the strike mode with large amplitude, and that neither of the shafts protrudes in the vibration mode with small amplitude. When mounting the actuator 100b, a side surface of the lower chassis 101a through which the shaft 118a or 118b protrudes can be affixed to a side surface of the chassis 11 of the smartphone 10, so that a vibration and a stroke can both be applied to the chassis 11 in the directions along the axis of vibration. In this case, at the same time, the upper chassis 101b may be affixed to the rear surface of the touch screen 13, or the lower chassis 101a may be affixed to the bottom surface of the chassis 11.

Figure 9A:
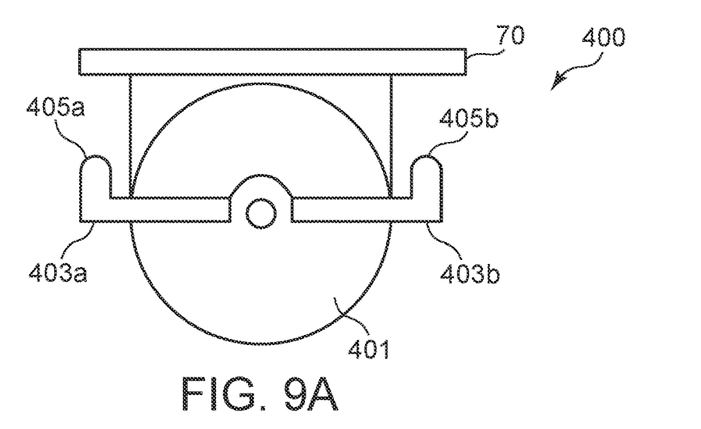
FIGS. 9A-9C illustrate a bidirectional rotary actuator.
Figure 9B:
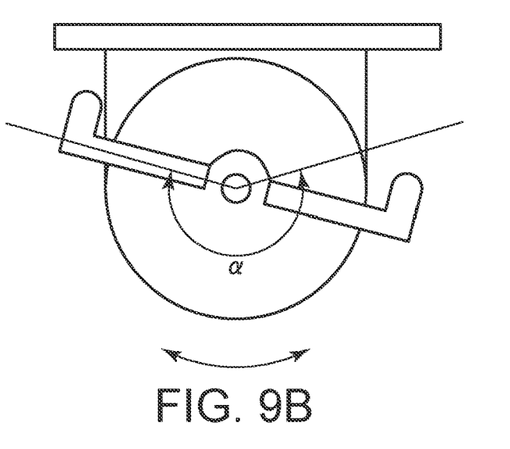
Figure 9C:
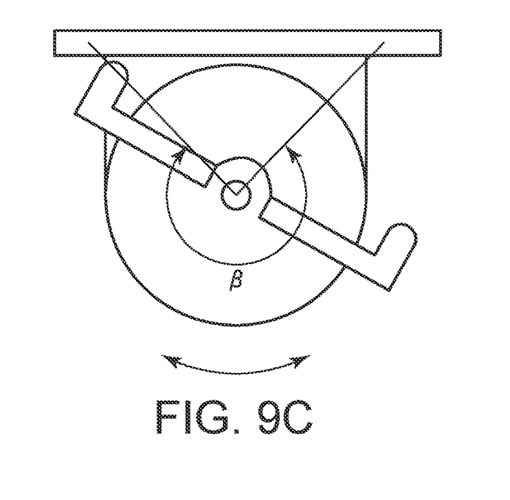

While the actuators 100, 100a, and 100b have the movable element 150 that performs a reciprocating linear motion, the direction of the motion of the movable element is not limited thereto. The present invention is applicable to a rotary actuator in which a movable element including an eccentric weight, such as an ERM, performs a rotational motion. FIGS. 9A, 9B, and 9C are plan views, as seen in an axial direction, of an actuator 400 which generates a vibration by causing an eccentric weight 401 to rotate in two directions like a pendulum. The actuator 400 has its main body fixed to a vibrating body 70.

The eccentric weight 401 has, on respective sides, arms 403a and 403b equipped with hammers 405a and 405b, respectively. A motor performs a bidirectional rotational operation through cooperation of a coil through which an electric current flows and a magnet. FIG. 9A illustrates the state where the eccentric weight 401 is stationary, with no driving voltage applied to the coil of the motor.

FIG. 9B illustrates the state where the eccentric weight 401 rotates bidirectionally through a predetermined rotation angle α as a driving voltage preset for the vibration mode is applied. In the vibration mode, although the vibration of the main body propagates to the vibrating body 70, the hammers 405a and 405b do not impact the vibrating body 70, as the rotation angle α is small.

FIG. 9C illustrates the state where the eccentric weight 401 rotates bidirectionally when a driving voltage for the strike mode larger than the driving voltage for the vibration mode is applied. In the strike mode, an angular acceleration occurring in the eccentric weight 401 becomes larger than in the vibration mode, leading to an increased rotation angle β, so one of the hammers 405a and 405b strikes the vibrating body 70.

Figure 10A:
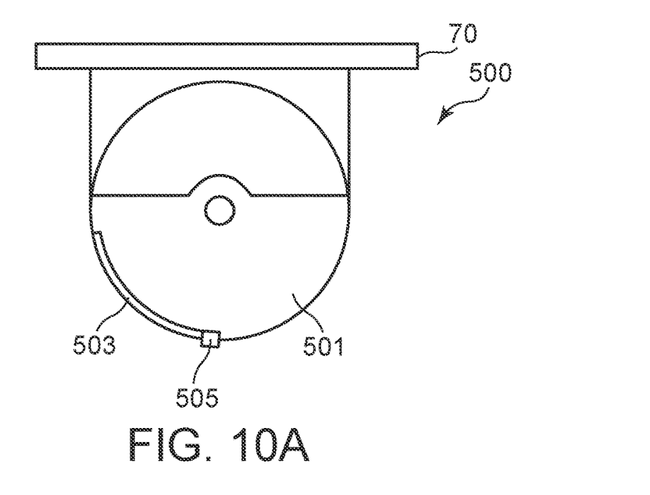
FIGS. 10A-10C illustrate a (unidirectional) rotary actuator.
Figure 10B:
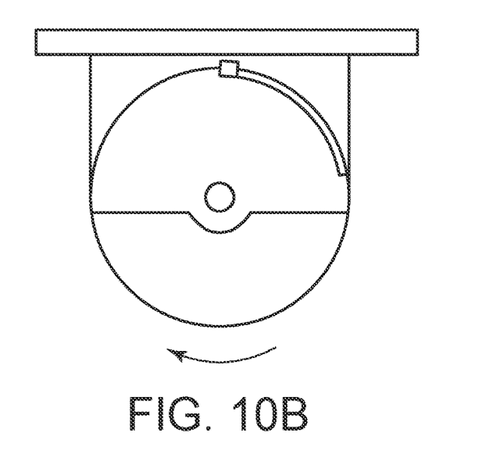
Figure 10C:
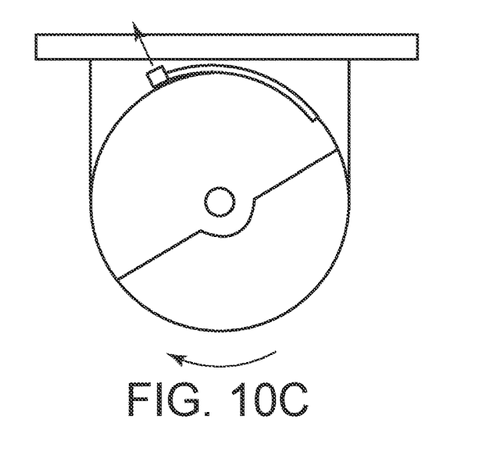

FIGS. 10A, 10B, and 10C are plan views, as seen in an axial direction, of an actuator 500 that generates a vibration by causing an eccentric weight 501 to rotate in one direction. The actuator 500 has its main body fixed to a vibrating body 70. On the periphery of the eccentric weight 501, a hammer 505 is fixed via a leaf spring 503. A motor performs a rotational operation through cooperation of a coil through which an electric current flows and a magnet. FIG. 10A shows the state where no driving voltage is applied to the coil of the motor. The leaf spring 503 urges the hammer 505 so as to let it remain in a home position closest to the axis.

FIG. 10B shows the state where the eccentric weight 501 rotates at a predetermined rotational speed when a driving voltage preset for the vibration mode is applied. In the vibration mode, a vibration of the main body that has occurred from rotation of the eccentric weight 501 propagates to the vibrating body 70. The hammer 505 is displaced only a small distance from the home position by centrifugal force, but the displacement is not enough for the hammer to impact the vibrating body 70.

FIG. 10C shows the state where the eccentric weight 501 rotates when a driving voltage larger than the driving voltage for the vibration mode is applied in the strike mode. In the strike mode, the rotational speed becomes higher than in the vibration mode, so the hammer 505 is displaced a larger distance by the centrifugal force, allowing it to strike the vibrating body 70. With the application of the driving voltage stopped, the rotational speed decreases, so the hammer 505 returns to its home position with the elastic force of the leaf spring 503.

As has been described, the present invention provides an improved technique for generating haptic feedbacks for electronic apparatuses.

While the invention has been particularly shown and described with reference to a preferred embodiment, it will be understood by those skilled in the art that various changes in form and detail may be made therein without departing from the spirit and scope of the invention.

What is claimed is:

1. A haptic actuator, comprising:
a vibration mechanism having a movable element,
in response to a receipt of a first driving current, vibrates said movable element at a first vibration acceleration having a first amplitude along a plane of a surface of a device to which said haptic actuator is attached;
in response to a receipt of a second driving current larger than said first driving current, vibrates said movable element at a second vibration acceleration having a maximum amplitude higher than said first amplitude along said plane of said surface of said device; and
a striking mechanism, in response to a receipt of said maximum amplitude of said second vibration acceleration higher than said first amplitude of said first vibration acceleration, strikes said surface of said device.

2. The haptic actuator of claim 1, wherein said vibration mechanism further includes a coil an a magnet for providing a magnetic field around said coil to vibrate said movable element.

3. The haptic actuator of claim 1, wherein said first driving current is a square wave.

4. The haptic actuator of claim 3, wherein said second driving current is a square wave.

5. The haptic actuator of claim 3, wherein said striking mechanism is a hammer.

6. The haptic actuator of claim 1, wherein said vibration mechanism vibrates said movable element steadily in response the receipt of said first driving current.

7. The haptic actuator of claim 6, wherein said vibration mechanism vibrates said movable element by ramping up to a maximum amplitude in response to the receipt of said second driving current, and then ramping down from said maximum amplitude after the supply of said second driving current has stopped.

8. The haptic actuator of claim 2, wherein said vibration mechanism includes an eccentric weight that rotates at a prescribed rotational speed in response to the receipt of said first driving current to said coil.

9. The haptic actuator of claim 8, wherein said striking mechanism strikes said surface of said device as said striking mechanism is displaced in conjunction with a rotation of said eccentric weight responsive to an application of said second driving current larger than said first driving current to said coil.

10. The haptic actuator of claim 2, wherein said vibration mechanism includes an eccentric weight that rotates bidirectionally through a prescribed rotation angle in response to the receipt of said first driving current to said coil.

11. The haptic actuator of claim 10, wherein said striking mechanism strikes said surface of said device as said striking mechanism is displaced in conjunction with a displacement of said eccentric weight responsive to an application of said second driving current larger than said first driving current to said coil.

12. An electronic apparatus, comprising:
a chassis;
a display surface associate with said chassis; and
a haptic actuator having
a vibration mechanism having a movable element,
in response to a receipt of a first driving current, vibrates said movable element at a first vibration acceleration having a first amplitude along a plane of a surface of a device to which said haptic actuator is attached;
in response to a receipt of a second driving current larger than said first driving current, vibrates said movable element at a second vibration acceleration having a maximum amplitude higher than said first amplitude along said plane of said surface of said device; and
a striking mechanism, in response to a receipt of said maximum amplitude of said second vibration acceleration higher than said first amplitude of said first vibration acceleration, strikes said surface of said device.

13. The electronic apparatus of claim 12, wherein said vibration mechanism further includes a coil and a magnet for providing a magnetic field around said coil to vibrate said movable element.

14. The electronic apparatus of claim 12, wherein said vibration mechanism vibrates said movable element steadily in response the receipt of said first driving current.

15. The electronic apparatus of claim 14, wherein said vibration mechanism vibrates said movable element by ramping up to a maximum amplitude in response to the receipt of said second driving current, and then ramping down from said maximum amplitude after the supply of said second driving current has stopped.

16. A method comprising:
attaching an haptic actuator to a surface of a device;
during a vibration mode, supplying a first driving current to said haptic actuator to cause a movable element within said haptic actuator to vibrate along a plane of said surface of said device at a first vibration acceleration having a first amplitude; and
during a strike mode, supplying a second driving current larger than said first driving current to said haptic actuator to cause said movable element to vibrate along said plane of said surface of said device at a second vibration acceleration having a maximum amplitude higher than said first amplitude of said first vibration acceleration, and to cause a hammer to strike said surface of said device.

17. The method of claim 16, wherein said second amplitude of said vibration of said movable element occurs before said supply of said second driving current has stopped.

18. The method of claim 16, wherein said second amplitude of said vibration of said movable element causes said hammer to strike said surface of said device.

19. The electronic apparatus of claim 12, wherein said first driving current and said second driving current are square waves.

20. The electronic apparatus of claim 12, wherein said striking mechanism is a hammer.

\* \* \* \* \*